United States Patent [19]

Gabriel et al.

[11] Patent Number: 4,582,077

[45] Date of Patent: Apr. 15, 1986

[54] ARRANGEMENT FOR CLEANING OF OBJECTS BY MEANS OF A CLOSE ULTRASONIC FIELD

[75] Inventors: Karel Gabriel, Pilsen; Frantisek Smolik, Strasice; Eduard Steif, Pilsen; Vaclav Sabek, Vejprnice, all of Czechoslovakia

[73] Assignee: Skoda, koncernovy podnik, Pilsen, Czechoslovakia

[21] Appl. No.: 643,017

[22] Filed: Aug. 22, 1984

[30] Foreign Application Priority Data

Aug. 22, 1983 [CS] Czechoslovakia ............... 6114-83

[51] Int. Cl.$^4$ .............................................. B08B 3/12
[52] U.S. Cl. .................................... 134/94; 134/107; 134/184

[58] Field of Search ............... 134/1, 94, 95, 98, 99, 134/107, 117, 135, 145, 147, 148, 152, 155, 164, 167 R, 168 R, 169 R, 170, 174, 184, 186

[56] References Cited

U.S. PATENT DOCUMENTS

| | | | |
|---|---|---|---|
| 1,799,525 | 4/1931 | Morgan | 134/170 X |
| 2,215,018 | 9/1940 | Schmitt | 134/170 X |
| 2,270,452 | 1/1942 | Kern | 134/169 R X |
| 2,814,575 | 11/1957 | Lange, Jr. | 134/152 X |
| 4,064,885 | 12/1977 | Dussault et al. | 134/184 X |
| 4,363,223 | 12/1982 | Abbott | 134/168 R X |

Primary Examiner—Philip R. Coe

[57] ABSTRACT

An ultrasonic cleaning arrangement particularly suitable for the cleaning of cylindrical filters to remove contaminations of medium sticking ability where the cleaned object is exposed to radiation of a close ultrasonic field while a liquid cleaning medium flows, in the course of cleaning, through the object to be cleaned.

3 Claims, 1 Drawing Figure

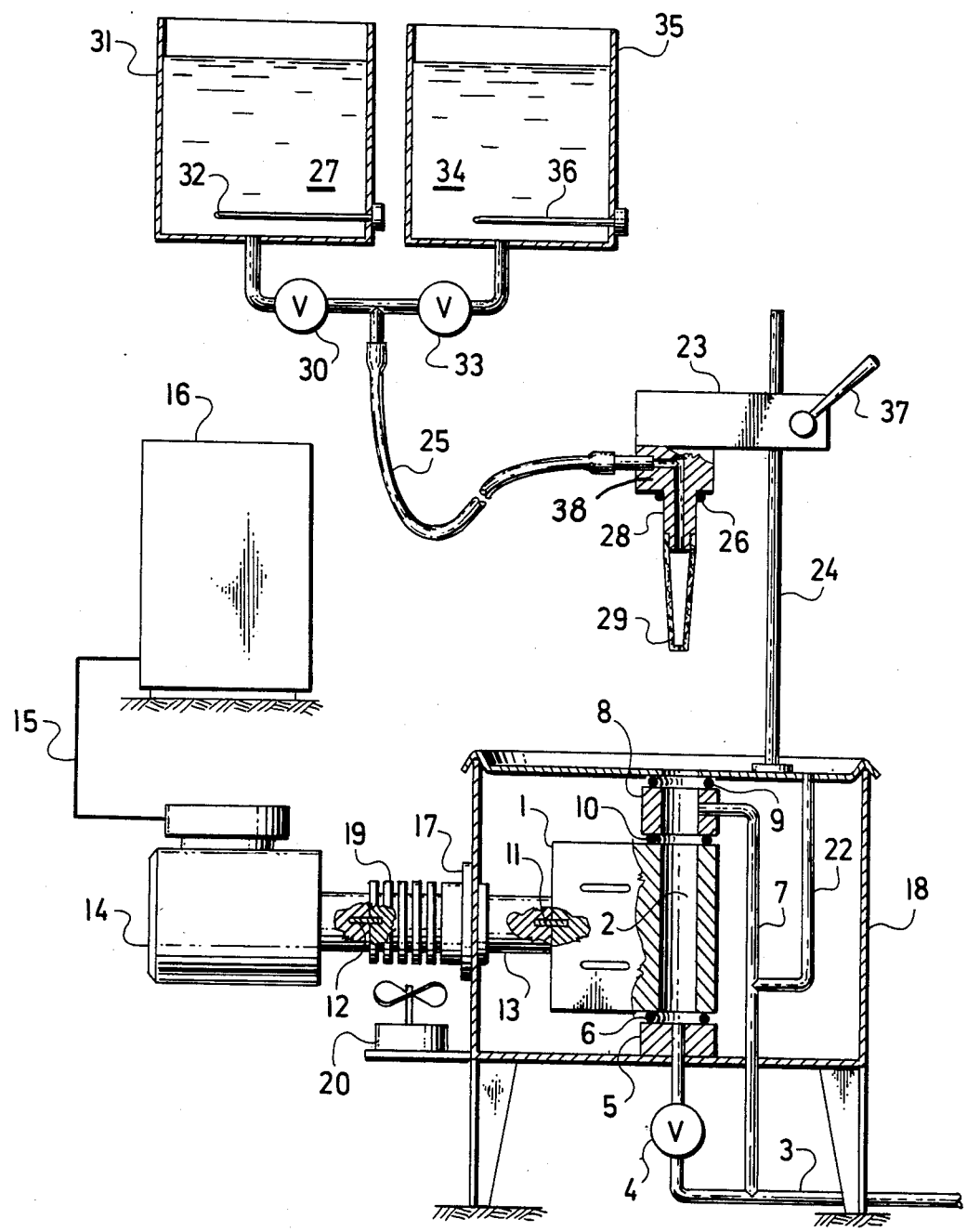

ARRANGEMENT FOR CLEANING OF OBJECTS BY MEANS OF A CLOSE ULTRASONIC FIELD

BACKGROUND OF THE INVENTION

The invention relates to an arrangement for cleaning of objects by means of a close ultrasonic field, particularly suited for cleaning cylindrical filters. The arrangement comprises an ultrasonic cleaning tool with a cleaning opening connected by a tuned transfer conduit to an ultrasonic transducer which is, in turn, electrically connected to a high frequency generator. The arrangement also comprises a housing, a holder for the object to be cleaned and a supply source of liquid cleaning medium.

Known ultrasonic cleaning arrangements generally comprise a tank with a cleaning medium, an ultrasonic radiator and a high-frequency generator. These arrangements do not achieve a perfect cleaning and are ineffective for removing contaminations with medium sticking ability. A more advantageous arrangement is described in German patent specification DOS 2 624 369 which shows a construction that provides for concentrated ultrasonic power from active acoustic transducers radiated into the cleaning liquid. Even this arrangement, however, has the drawback that there is no continuous supply of cleaning liquid into the space containing the objects to be cleaned. Such a continuous supply of cleaning liquid is needed in order to achieve a perfect and quick cleaning. In addition, the multi-surface oscillating element which is situated within a housing operates in an open tank containing cleaning liquid, such that the applied acoustic transducer cannot be used when the temperature of the cleaning liquid exceeds 90° C.

SUMMARY OF THE INVENTION

It is an object of the present invention to provide an ultrasonic cleaning arrangement for cleaning of objects by a close ultrasonic field which is particularly suited for the cleaning of cylindrical filters (e.g. oil filters for NC machines) to remove impurities with medium sticking ability quickly and perfectly.

The arrangement according to the present invention comprises a housing, the upper part of which forms a working desk with a discharge conduit. Within the housing there is at least one ultrasonic cleaning tool with a cleaning opening. At the lower part of the cleaning opening, a waste conduit with a first valve is connected by means of a flange and packed by a first packing. At the end upper part of the cleaning opening, an upper flange with an overflow conduit is connected and is packed by a third packing. Above this a second packing connects the cleaning opening to the working desk.

The working desk is provided with a stand with an adjustable arm which can be adjusted vertically by a set screw. The arm has a holder which holds the object to be cleaned. The holder is connected to a fourth flange by a fourth packing. The fourth flange is connected by a pliable supply conduit to a valve which in turn connects the conduit to a tank. The tank contains a cleaning medium and is provided with a heating element. An alternative embodiment includes an additional tank and valve connected to the conduit where the second tank contains a rinsing medium and is also provided with a heating element.

Alternatively, the pliable supply conduit may, instead of terminating at the fourth flange on the arm, terminate at the upper flange at the top of the cleaning opening of the ultrasonic cleaning tool.

An advantage of the arrangement according to the present invention is that it enables the cleaning of objects with the removal of contaminations having medium sticking ability. The intensity of the ultrasonic field achieved within the cleaning opening is about $20 \times 10^4$ W/m$^2$ and depends predominantly on the amplitude deviation of the ultrasonic cleaning tool. The arrangement can operate when the temperature of the cleaning liquid is higher than 90° C. Since the ultrasonic power is radiated very close to the cleaned object in a relatively small volume of cleaning liquid, substantial saving in power is achieved as compared to the typical ultrasonic cleaning arrangement using a tank filled with liquid cleaning medium.

BRIEF DESCRIPTION OF THE DRAWING

With these and other objects in view, which will become apparent in the following detailed description, the present invention, which is shown by example only, will be clearly understood in connection with the accompanying drawing, wherein the single FIGURE is a schematic diagram of the arrangement according to the invention.

DETAILED DESCRIPTION OF THE DRAWING

The arrangement shown in the drawing comprises an ultrasonic cleaning tool 1 with a cleaning opening 2. A waste conduit 3, provided with a first valve 4 and packed by a first packing 6, is connected by means of a lower flange 5 to the cleaning opening 2. An overflow conduit 7 and a draining conduit 22 also terminate in waste conduit 3.

Overflow conduit 7 is connected to the upper part of cleaning opening 2 by upper flange 8 and is packed by a third packing 10. The upper flange 8 is also connected to a working desk 21 and is packed by a second packing 9.

The ultrasonic cleaning tool 1 is connected to a tuned transfer conduit 13 by a first screw connection 11. The tuned transfer conduit 13 passes through a third flange 17 in the wall of housing 18 and is provided with cooling ribs 19 which are cooled by a ventilator 20. A second screw connection 12 connects the tuned transfer conduit 13 to an ultrasonic transducer 14. The ultrasonic transducer 14 is electrically connected to a high frequency generator 16 by a cable 15.

One or more ultrasonic cleaning tools 1 are arranged in series or in parallel in the housing 18 which is provided in its upper part with a working desk 21.

The working desk 21 is provided with both a draining conduit 22 which terminates into the waste conduit 3 and also with a stand 24 with a vertically adjustable arm 23. The adjustable arm 23 can be adjusted by reset screw 37 and is also provided with a holder 28 to hold the object to be cleaned 29. Holder 28 is packed by a fourth packing 26 and is connected to a pliable supply conduit 25 by means of a fourth flange 38. The pliable supply conduit 25 is, at its other end, connected to a second valve 30 and a third valve 33. Valve 30 connects conduit 25 to a first tank 31 containing a liquid cleaning medium 27 and provided with a first heating element 32. Valve 33 connects conduit 25 to a second tank 35 containing a rinsing medium 34 and a second heating element 36.

The object to be cleaned 29 is fixed on holder 38 such that its axis is coincident with the axis of the cleaning opening 2.

The arrangement operates as follows:

The fourth flange 38 with pliable conduit 25 is, after loosening the set screw 37, lowered to the working desk 21. By opening the second valve 30, liquid cleaning medium 27 is filled to about halfway up the cleaning opening 2. After closing the second valve 30, the adjustable arm 23 with fourth flange 38 is raised and secured in the raised position by set screw 37. The object to be cleaned 29 is then fixed to the holder 28. After loosening the set screw 37, the object to be cleaned 29 is lowered into the cleaning opening 2 and is secured in this position by set screw 37. The second valve 30 is the opened and liquid cleaning medium 27, which has been heated by first heating element 32 to the required temperature, starts to flow into the internal space of the object to be cleaned 29. The high-frequency generator 16 is then activated. This feeds high frequency currents over cable 15 to the ultrasonic transducer 14 which excites the ultrasonic cleaning tool 1 by way of the tuned transfer conduit 13. A high intensity of the ultrasonic field is radiated from the walls of cleaning opening 2, thus achieving a quick and perfect cleaning of the object 29 even when the object 29 contains impurities with medium sticking ability. This is achieved by a continuous supply of clean cleaning medium 27 into the internal space of the object 29, which medium 27 is drained over the overflow conduit 7 into the waste conduit 3.

The cleaning time is about 50 to 60 seconds. After the object has been cleaned, the second valve 30 is closed and a short rinsing by rinsing medium 34 can be accomplished after opening the third valve 33. When rinsing is finished, the third valve 33 is closed. The set screw 37 is now loosened and the adjustable arm 23 is raised together with the object 29. The arm 23 is secured in the raised position by set screw 37 and the clean object 29 is removed from its holder 28. Further cleaning is performed in the same way, however, without the original filling of the cleaning opening 2 with the liquid cleaning medium 27. When cleaning is finished, the liquid cleaning medium 27 is discharged from the cleaning opening 2 over first valve 4 into waste conduit 3.

The supply conduit 25 which terminates in the fourth flange 38 may, alternatively, terminate in the upper flange 8 above the cleaning opening 2.

We claim:

1. An arrangement for cleaning of objects, particularly cylindrical filters, by a close ultrasonic field comprising a high-frequency generator, an ultrasonic transducer, a housing, an ultrasonic cleaning tool with a cleaning opening, a tank containing a heating element, a liquid cleaning medium and having an output, means for supporting an object to be cleaned, means for the supply of liquid cleaning medium from the output of the tank to the cleaning tool;

said high-frequency generator feeding the ultrasonic transducer which is in turn connected by a tuned transfer conduit with the cleaning opening of the ultrasonic cleaning tool, the ultrasonic cleaning tool being situated in said housing;

a working desk situated on the upper part of said housing and being connected to the upper part of the cleaning opening of the ultrasonic cleaning tool by means of an upper flange;

a waste conduit with a first valve connected to the lower part of said cleaning opening by means of a lower flange;

an overflow conduit terminating into said waste conduit at one end and connected to the upper flange at the other end;

a draining conduit terminating into said waste conduit at one end and connected to the working desk at the other end;

a stand mounted on the working desk;

an adjustable arm slidably mounted on said stand with means to fix its position and;

a holder for the object to be cleaned connected to said arm by means of a further flange.

2. An arrangement as in claim 1 wherein the means for supplying liquid cleaning medium comprises a pliable supply conduit terminating at one end in said further flange and connected at the other end to a second valve which is connected to the output of the tank containing the cleaning medium.

3. An arrangement as in claim 1 further comprising a second tank containing a rinsing medium and a second heating element and having an output and means for substituting the output of said second tank for the output of the first tank.

* * * * *